(12) United States Patent
Weiss

(10) Patent No.: US 10,650,446 B2
(45) Date of Patent: May 12, 2020

(54) SYSTEM AND METHOD FOR GENERATING A VIRTUAL CREDIT SCORE AND A RESPECTIVE VIRTUAL CREDIT LINE

(71) Applicant: Behalf Ltd., RaAnana (IL)

(72) Inventor: Russell Weiss, Modiln Ilit (IL)

(73) Assignee: Behalf Ltd., RaAnana (IL)

( * ) Notice: Subject to any disclaimer, the term of this patent is extended or adjusted under 35 U.S.C. 154(b) by 359 days.

(21) Appl. No.: 14/582,692

(22) Filed: Dec. 24, 2014

(65) Prior Publication Data

US 2015/0178829 A1 Jun. 25, 2015

Related U.S. Application Data

(60) Provisional application No. 61/920,748, filed on Dec. 25, 2013.

(51) Int. Cl.
*G06Q 40/02* (2012.01)

(52) U.S. Cl.
CPC .......... *G06Q 40/025* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 6,629,081 B1 | 9/2003 | Cornelius et al. | |
| 7,014,469 B1 | 3/2006 | Nocera et al. | |
| 7,155,409 B1 | 12/2006 | Stroh | |
| 7,797,214 B2 | 9/2010 | Rosen et al. | |
| 7,797,217 B2 | 9/2010 | Rosen et al. | |
| 7,938,316 B2 | 5/2011 | Bennett et al. | |
| 7,942,316 B2 | 5/2011 | Bennett et al. | |
| 7,983,951 B2 | 7/2011 | Frohwein et al. | |
| 8,073,744 B1 | 12/2011 | Frohwein et al. | |
| 8,181,851 B2 | 5/2012 | Bennett et al. | |

(Continued)

FOREIGN PATENT DOCUMENTS

WO  WO 2015/100413  7/2015

OTHER PUBLICATIONS

International Preliminary Report on Patentability dated Jul. 7, 2016 From the International Bureau of WIPO Re. Application No. PCT/US2014/072352.

(Continued)

*Primary Examiner* — Joseph W. King

(57) ABSTRACT

A system and method for generating a virtual credit score in real-time and establishing a credit line to a customer of a customer node. The method comprises receiving at least one customer identifier of the customer from a supplier node, wherein the customer performs an electronic commerce transaction with respect to the supplier node; retrieving data respective of the customer from at least one data source, wherein the date is retrieved using the at least one customer identifier; analyzing the retrieved data to determine at least one further customer identifier; generating the virtual credit score for the customer at least based on the determined at least one further customer identifier; comparing the virtual credit score to a virtual credit threshold to determine if the customer meets the virtual credit threshold; and upon determining that the customer meets the virtual credit threshold, establishing the credit line to the customer.

22 Claims, 3 Drawing Sheets

(56) References Cited

U.S. PATENT DOCUMENTS

| | | |
|---|---|---|
| 8,214,238 B1 | 7/2012 | Fairfield et al. |
| 8,533,110 B2 | 9/2013 | Kremen et al. |
| 2002/0095373 A1 | 7/2002 | Melchior et al. |
| 2005/0149408 A1 | 7/2005 | Kenny et al. |
| 2005/0149417 A1 | 7/2005 | Crescenzo et al. |
| 2006/0149668 A1 | 7/2006 | Zafrir |
| 2008/0177655 A1* | 7/2008 | Zalik .................. G06Q 40/02 705/38 |
| 2008/0281726 A1* | 11/2008 | Gupta ............... G06Q 30/0601 705/26.1 |
| 2010/0010930 A1* | 1/2010 | Allen .................. G06Q 30/04 705/38 |
| 2010/0057609 A1* | 3/2010 | Sibson ................ G06Q 20/10 705/38 |
| 2011/0015974 A1 | 1/2011 | Zafrir |
| 2011/0178900 A1* | 7/2011 | Imrev .................. G06Q 10/10 705/30 |
| 2011/0208642 A1* | 8/2011 | Shader ................ G06Q 20/02 705/39 |
| 2011/0313884 A1 | 12/2011 | Eze |
| 2012/0036032 A1 | 2/2012 | Frohwein et al. |
| 2012/0233010 A1 | 9/2012 | Frohwein et al. |
| 2013/0211892 A1 | 8/2013 | Frohwein et al. |

OTHER PUBLICATIONS

International Search Report and the Written Opinion dated May 21, 2015 From the International Searching Authority Re. Application No. PCT/US2014/072352.

The International Search Report and the Written Opinion of the International Searching Authority for PCT/US2014/072352, ISA/RU, Moscow, Russia, dated May 21, 2015.

\* cited by examiner

SYSTEM AND METHOD FOR GENERATING A VIRTUAL CREDIT SCORE AND A RESPECTIVE VIRTUAL CREDIT LINE

CROSS-REFERENCE TO RELATED APPLICATIONS

This application claims the benefit of U.S. Provisional Application No. 61/920,748 filed on Dec. 25, 2013, the contents of are herein incorporated by reference

TECHNICAL FIELD

The present disclosure relates generally to computerized financing platforms, and more specifically to generating virtual credit scores for customers and extending virtual credit lines respective thereof over the web.

BACKGROUND

When a customer wishes to buy an item from a supplier that requires financing, the customer often requests terms of repayment from the supplier. The supplier may decline to provide the customer a line of credit because either the customer is unknown to the supplier or the risk failure to repay the supplier is perceived as too great. In such a case, the customer will then usually contact his or her lending institution to apply for a monetary loan. After checking the customer's business information and business credit standing as well as the customer's personal information and credit history, a representative of the lending institution informs the customer of the loan amount, period, and interest rate for which he or she is eligible. If the customer agrees to the terms of the loan, the lending institution's representative delivers documentation to the customer that, when executed, grants a security interest in the purchased product to the lending institution in exchange for the monetary loan.

The ways in people purchase goods have significantly progressed since the development of the worldwide web (WWW). Via electronic commerce (e-commerce), customers can now shop online from the convenience of their home, office, or while on the road using portable devices. However, while these and other online purchasing options are often significantly more convenient than their manual counterparts, financing such purchases still requires time and effort from the customer in addition to providing efficient securities to the lending institute. Thus, the financing process as described above is currently not useful for e-commerce transactions as it requires initiating an interaction and negotiation process with the loan officer of the financial institute.

Furthermore, the described typical lending procedure does not include a structured tool for the lender to track the lent money after monetary payment to the customer, and therefore the lender cannot monitor that the lent money was actually paid by the customer to the supplier according to the terms and conditions of the loan. For example, the customer may be a bakery requesting a loan for a new oven. However, the provided loan may be used for payments of debts of the bakery business. The lender in most cases has no knowledge of how the lent money is being spent.

The common practice of financial institutes or creditors is to determine a loan term primarily based on a credit score of the customer. However, credit scores do not always reflect the current economic strength of a customer which may be a person or business. As an example, a credit score of a small business may be low even when that business is profitable. As a counter example, a well-established business with a high credit score may suffer from temporary financial difficulties. The business's current financial standing may not be appropriately reflected in the credit score. Investigating the financial standing of the customer can be performed by a loan officer after reviewing numerous identifiers provided by the customer. As such, this practice cannot currently be utilized for e-commerce transactions.

Moreover, existing solutions do not allow a financial institute or other creditor to automatically and electronically establish a line of credit once the purchaser is deemed able to repay the loan. Thus, a customer who would likely be deemed worthy of receiving the line of credit may not be able to obtain such financing until he or she physically interacts with an agent of a financial institution.

Thus, the current solutions do not allow customers to conveniently shop and, upon deciding upon a purchase, obtaining financing via an established line of credit without needing to be personally present at a financial institution or at a business. That is, there is no current solution to approve/disapprove financing of an e-commerce transaction in real-time based on the current financial standing of the customer.

It would be advantageous to provide a solution that overcomes the deficiencies of conventional financing solutions.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Various embodiments disclosed herein include a method for generating a virtual credit score in real-time and establishing a credit line to a customer of a customer node. The method comprises: receiving at least one customer identifier of the customer from a supplier node, wherein the customer performs an electronic commerce transaction with respect to the supplier node; retrieving data respective of the customer from at least one data source, wherein the data is retrieved using the at least one customer identifier; analyzing the retrieved data to determine at least one further customer identifier; generating the virtual credit score for the customer at least based on the determined at least one further customer identifier; comparing the virtual credit score to a virtual credit threshold to determine if the customer meets the virtual credit threshold; and upon determining that the customer meets the virtual credit threshold, establishing the credit line to the customer.

Various embodiments disclosed herein also include a system for generating a virtual credit score in real-time and establishing a credit line to a customer of a customer node. The system comprises: a processor; and a memory, the memory containing instructions that, when executed by the processor, configure the system to: receive at least one customer identifier of the customer from a supplier node, wherein the customer performs an electronic commerce transaction with respect to the supplier node; retrieve data respective of the customer from at least one data source, wherein the data is retrieved using the at least one customer identifier; analyze the retrieved data to determine at least one further customer identifier; generate the virtual credit score for the customer at least based on the determined at least one further customer identifier; compare the virtual credit score to a virtual credit threshold to determine if the customer meets the virtual credit threshold; and upon determining that the customer meets the virtual credit threshold, establish the credit line to the customer.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
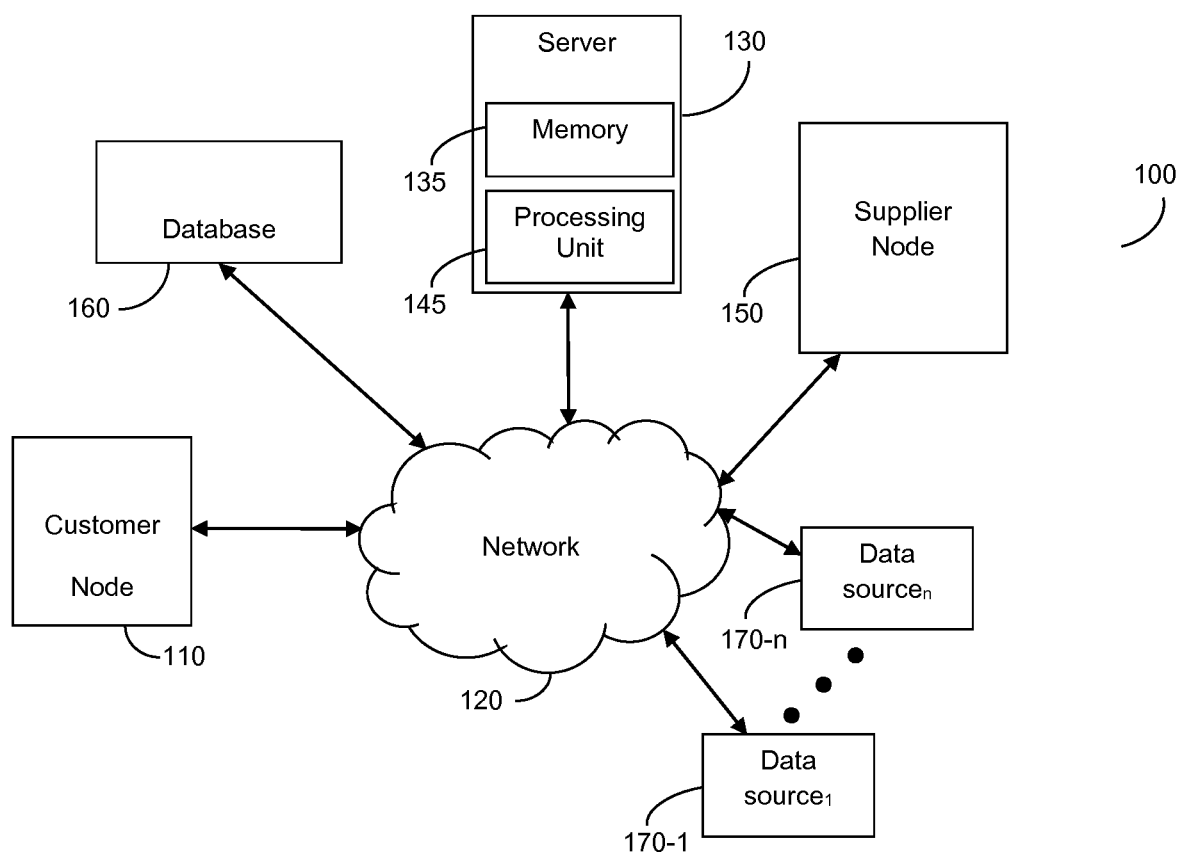
FIG. 1 is a schematic diagram of a network system utilized to describe the various embodiments of compute virtual credit scores and extending virtual credit lines.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example, various embodiments for computing virtual credit scores for a customer and for establishing a credit line respective thereof are disclosed. A virtual credit score represents a current creditworthiness or current risk for a customer who wishes to finance a specific product to be purchased through an electronic commerce (e-commerce) transaction. A customer requesting the financing of the purchased transaction may be, for example, a person or a business. A product includes, but is not limited to, a service or a good.

In a non-limiting embodiment, a request is received from a supplier node to generate a virtual credit score to a customer of a customer node over the web. The request contains identifiers related to the customer. The identifiers are analyzed to compute a virtual credit score which is generated for the customer. The type of the supplier node is identified. Upon determination that the computed virtual credit score crosses the virtual credit threshold, a notification is provided to the supplier node. According to another embodiment, a credit line may also be generated for the customer of the customer node respective of the virtual credit score. It should be noted that if the credit line is established the customer is the debtor. The creditor is typically not the supplier, but a third entity employing the disclosed embodiments.

FIG. 1 shows an exemplary and non-limiting schematic diagram of a network system 100 utilized to describe the various embodiments for electronically financing purchase orders. A customer accesses a network 120 via a customer node 110 that is communicatively connected to the network 120. The customer node 110 may be, but is not limited to, a personal computer (PC), a laptop computer, a mobile device, a smart phone, a smart TV, a wearable computing device, and so on. The network 120 may be, but is not limited to, a wired network, a wireless network, a local area network (LAN), a wide area network (WAN), a metro area network (MAN), the Internet, the worldwide web (WWW), a combination thereof, and so on.

The network 120 is further communicatively connected to a financing server 130. The financing server 130 is configured to electronically receive a request from a supplier node 150 to generate a virtual credit score from the customer node 110. The request may also be a request to generate a virtual credit line for a customer. The supplier node 150 may be any computing device that takes part in an e-commerce transaction. For example, the supplier node may include, but is not limited to, a PC, a laptop computer, a mobile device, a smart phone, a point of sale (PoS) machine, a web server, an application server, and so on. In an embodiment, the supplier node 150 operates one or more electronic commerce (e-commerce) websites. The financing server 130 is configured to identify a type of the supplier node 150.

The request further includes customer identifiers related to the customer of the customer node 110. A customer identifier may be, but is not limited to, a name of the customer, a mailing address, an IP address of the customer node 110, a customer email address, a customer phone number, a customer social security number, content information requested from the supplier node 150 by the customer node 110, demographic information of the customer, and so on. Content requested by the customer node 110 may include, but is not limited to, goods, services, prices of goods and/or services, shipping conditions of goods, and so on. Such content may be viewed by the customer node 110 via a website operated by the supplier node 150.

Upon receiving customer identifiers, the financing server 130 is configured to extract data related to the customer from a plurality of data sources 170-1 through 170-n (hereinafter referred to collectively as data sources 170 or individually as a data source 170, merely for simplicity purposes). The data sources 170 may be, but are not limited to, credit bureau databases, social networks, governmental data sources, combinations thereof, and so on. In an embodiment, information retrieved from a government data source may be a social security number (SSN) of the customer.

The types of data sources 170 from which data is extracted are determined by the financing server 130 based on a virtual threshold score. A virtual threshold score is at least one minimum requirement that a customer must meet before the customer will be approved for extending the line of credit. Requirements that customers must meet prior to approval may include, but are not limited to, a monetary value (e.g., $1,000; $20,000; etc.), a credit score by a credit bureau, an age of a customer (e.g., 18 years old, 21 years old, 25 years old, etc.), and so on. In another embodiment, the virtual credit threshold may be generated based on a type of the supplier node 150. The type of the supplier node 150 may be, but is not limited to, an e-commerce website, a rental agency (e.g., a car rental agency), a mortgage website, a brick-and-mortar business, a retail, and so on.

Based on the extracted data, the financing server 130 is configured to generate or otherwise compute a virtual credit score and a potential credit line for the customer of the node 110. The virtual credit score may be any numerical expression. The numerical expression may be normalized according to a monetary value (e.g., $1,000; $20,000; etc.), a credit score by a credit bureau, an age of a customer (e.g., 18 years old, 21 years old, 25 years old, etc.), and so on. The potential credit line is a tentative line of credit that will be extended to the customer only if the customer's virtual credit score meets the requirements of the virtual credit threshold. The generated virtual credit score is compared to the virtual credit threshold to determine if the threshold requirements have been met.

As a non-limiting example of comparing a virtual credit score to a virtual credit threshold, the extracted data indicates that the supplier node 150 operates an e-commerce website for consumer electronics, and a customer of the customer node 110 viewed a refrigerator for sale on the e-commerce website. In this example, the virtual credit threshold is normalized to represent the price of the refrigerator (e.g., $1,000). Respective thereto, data is extracted from a plurality of credit bureaus over the web in order to determine whether the customer is likely able to repay the credit line. In this example, it is determined that the customer is capable of repaying extensions of credit up to at least $1,100. Thus, the customer's virtual credit score is determined to be $1,000. Consequently, upon comparing the customer's virtual credit score to the virtual credit threshold, it is determined that the virtual credit score exceeds the virtual credit threshold.

As another non-limiting example, the extracted data indicates that the supplier node 150 operates a car rental agency website. In this example, the virtual credit threshold may be normalized to represent the cost of renting a car as well as a minimum age of 25 years old. It is determined that the customer is capable of repaying extensions of credit beyond the cost of renting a car, but that the customer's age is 21 years old. Thus, upon comparing the virtual credit score to the virtual credit threshold, it is determined that the customer does not meet at least one of the virtual credit threshold requirements.

In an embodiment, the financing server 130 may generate the potential credit line respective of the virtual credit score. In that embodiment, the financing server 130 may notify the supplier node 150 of the potential credit line and may provide a suggestion to the customer to accept and/or reject the potential credit line. The extracted data, the virtual credit score, the potential credit line, and the virtual credit threshold may be stored in the database 160.

Upon determination that the virtual credit score meets the virtual credit threshold requirements, the potential credit line is established as a virtual credit line to the customer. In an embodiment, a notification may be provided respective thereof to the supplier node 150 and to the customer node 110. According to another embodiment, the notification may be provided to the customer node 110 in response to a query received from the customer node 110. As a non-limiting example, the notification may be provided to the customer node 110 in response to the addition of an item to the customer's shopping cart while viewing an e-commerce website operated by the supplier node 150. In yet another embodiment, the notification may further include information related to the established virtual credit line. Information related to the established virtual credit line may include, but is not limited to, a URL to a webpage from which the customer may choose to use the virtual credit line.

The financing server 130 typically comprises a processing unit 145 that is communicatively connected to a memory 135. The memory 135 contains instructions that, when executed by the processing unit 145, results in the performance of the methods discussed herein below. Specifically, the memory 135 may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). In an embodiment, the processing unit 145 may include one or more processors. The instructions, when executed by the one or more processors, cause the processing unit 145 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Figure 2:
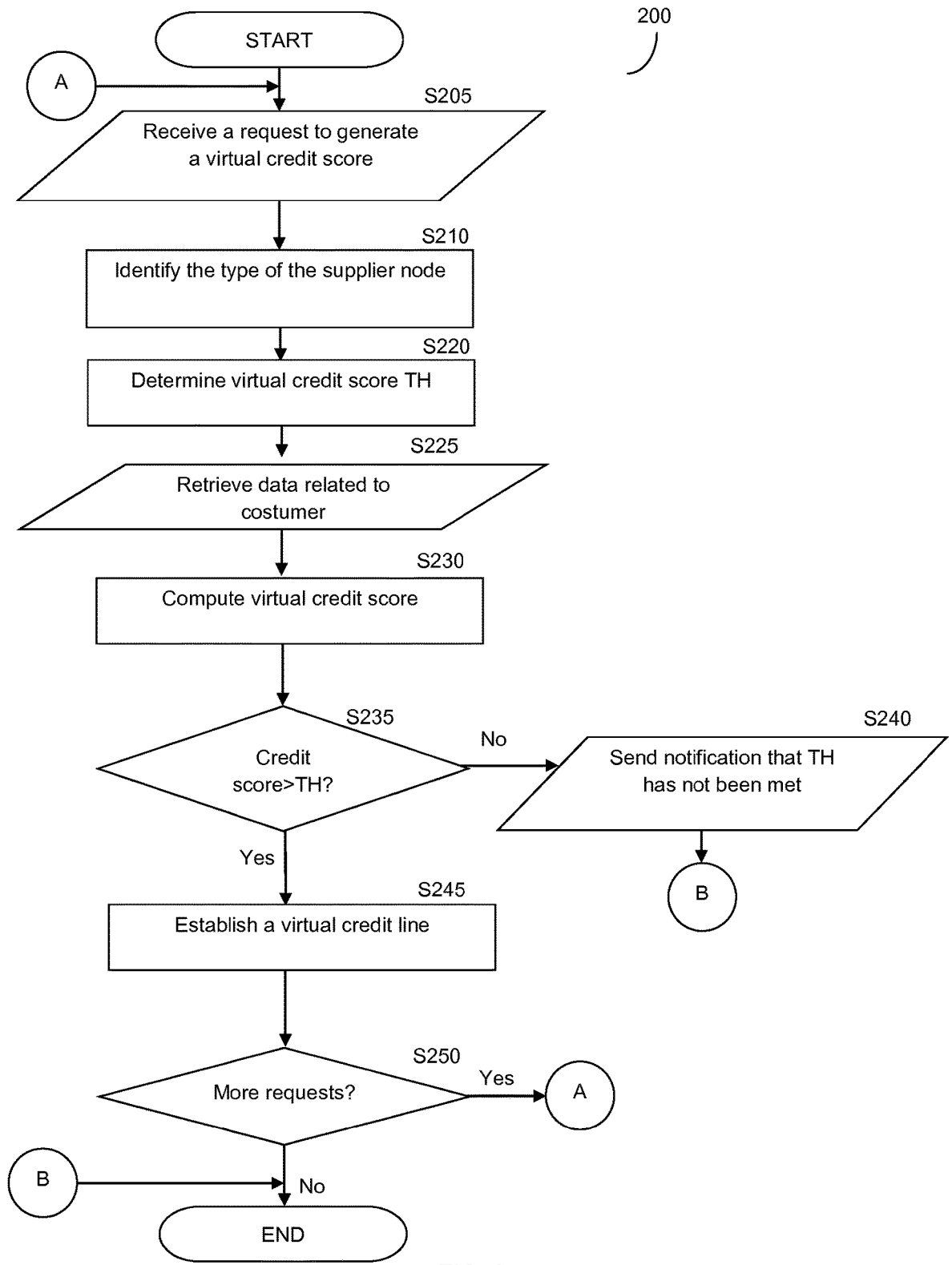
FIG. 2 is a flowchart illustrating a method for computing virtual credit scores and virtual credit lines respective thereof according to an embodiment.

FIG. 2 is an exemplary and non-limiting flowchart 200 illustrating a method for electronically financing purchase orders according to an embodiment. In an embodiment, the method of FIG. 2 may be performed by the financing server 130. In S205, a request to generate or compute a virtual credit score is received from, for example, a supplier node (e.g., the supplier node 150). The request typically includes customer identifiers related to a customer of a customer node (e.g., the customer node 110).

In S210, the type of the supplier node 150 is identified. The type of the supplier node may be, but is not limited to, an e-commerce website, a rental agency (e.g., a car rental agency), a mortgage website, a retail, a brick-and-mortar business, and so on. In an embodiment, other than the type, the supplier associated with the supplier node is identified. For example, the supplier identifiers may include any one or all of the suppliers' name, industry, geographical location, goods/services sold by the supplier, and so on.

In S220, a virtual credit score threshold is determined based on the characteristics of the supplier node. The determination is based on a set of possible threshold values set for different types of suppliers. As an example, for a supplier selling products that can be used as collateral, the virtual credit score threshold may be lower than that of a supplier selling consumable goods.

In S225, data related to the customer is retrieved from data sources (e.g., the data sources 170). In an embodiment, the data is retrieved using the customer identifiers received at S210. As noted above, the data sources may be, but are not limited to, credit bureau databases, social networks, governmental data sources, combinations thereof, and so on. The retrieved data may include, but is not limited to, a SSN, credit reports, reviews related to the customer, review related to past activity of a customer, employment status, demographic information, and so on. As noted above, a customer may be a business or a person. Thus, in an embodiment, if the customer is a business, then data related to the owner(s) of the business may be retrieved as well. In an embodiment, the retrieved data is further analyzed to determine further customer identifiers. As a non-limiting example, credit reports are analyzed to determine the credit standing of the customer, debt owned by the customer, past bankruptcies, and so on.

In S230, a virtual credit score is computed for the customer of the customer node respective of the extracted data. In an embodiment, the computing includes consideration of all identifiers (received at S210 or determined at S225). Each identifier is assigned a predefined weight value representing the importance of the identifier in determining a creditworthiness of the customer. As a non-limiting example, past bankruptcies, employment status, and a Twitter® post will be assigned with a high weight, a medium weight, and a low weight respectively. The assigned weights are applied to their respective identifiers, and the product thereof is summed to result with the virtual credit score. In an exemplary and non-limiting implementation, the virtual credit score is computed as follows:

$$VCS = F\{I_1, I_2, \ldots I_N \text{ and } W_1, W_2, \ldots, W_N\}$$

$$F = \sum_{j=1}^{N} Ij * Wj$$

Where VCS is the virtual credit score; $I_1, I_2, \ldots I_N$ are identifiers; and $W_1, W_2, \ldots, W_N$ are respective weights. It should be noted that the weights $W_1, W_2, \ldots, W_N$ may be set differently for different customers and/or suppliers. The weights $W_1, W_2, \ldots, W_N$ may be determined based on learnt information, various heuristics, global economic indicators, and so on. The weights $W_1, W_2, \ldots, W_N$ determine the sensitivity of the virtual credit score. The computed VCS may be further normalized to meet the dimensions of the virtual credit threshold. For example, the VCS may be normalized to a monetary value.

In S235, it is checked whether the virtual credit score meets the virtual credit threshold set at S220. If so, execution continues with S245; otherwise, execution continues with S240, where a notification that the virtual credit threshold has not been met is generated and sent to the supplier node before execution terminates.

In S245, a virtual credit line is established to the customer. In an embodiment, a notification that the threshold has been met is generated and sent to both the supplier node and to the customer node. The notification will typically include information related to the established virtual credit line. Establishing the potential credit line as a virtual credit line may include, but is not limited to, creating a web page from which a customer can accept the credit line, noting the purchased item as the subject of an asset-based loan, and designating the loan as a future payment. Establishment of virtual credit lines is described further herein below with respect to FIG. 3.

In S250, it is checked whether there are additional requests to process and, if so, execution continues with S205; otherwise, execution terminates.

Figure 3:
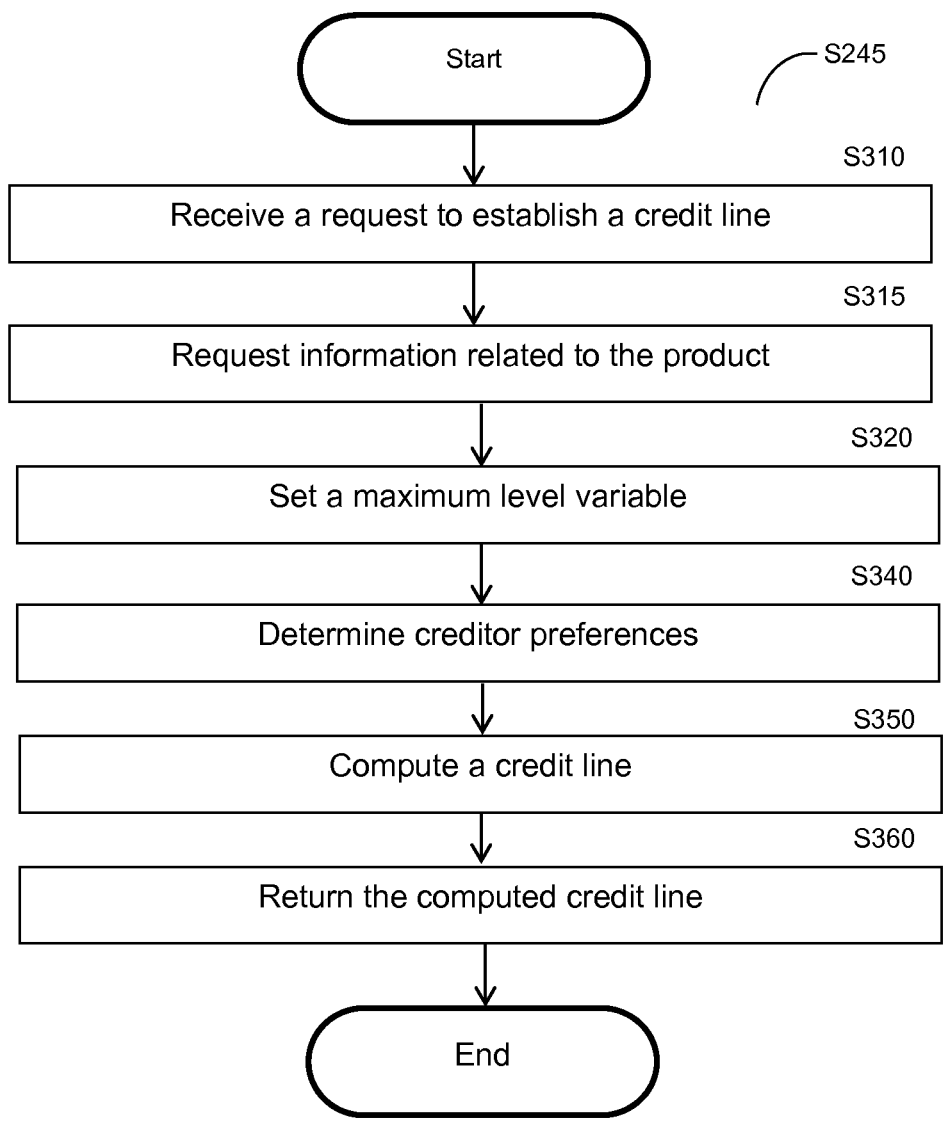
FIG. 3 is a flowchart illustrating establishing a virtual credit line according to an embodiment.

FIG. 3 is an exemplary and non-limiting flowchart S245 illustrating establishing a virtual credit line according to one embodiment. In S310, a request to establish a virtual credit line is received. The request includes at least the virtual credit score (as computed in S240) and at least the supplier and/or supplier node identifier. In S315, the supplier node is queried to provide additional information related to the product to be purchased. This information may include, for example, the current product's price and/or the amount to be financed. In S320, a maximum level variable of the credit line is set based on the information received in S315. For example, if the product's price is $1,000, than the maximum level variable is set to $1,000.

In S340, one or more creditor preferences are determined. A creditor preference may be, but is not limited to, no preference, a risk factor indicating the risk that creditor is willing to take that the loan will not be paid, a percentage to decrease or increase from the maximum level variable relative to the percentage of the threshold crossing, and so on. For example, if the virtual credit score computed for the customer exceeds the virtual credit score by 100%, 95% of the maximum level variable may be set as the credit line.

In S350, the credit line is set respective of the computer virtual credit score, the maximum level variable, and of the creditor preferences. In an exemplary and non-limiting implementation, the credit line is set as follows:

$$CL = F\{MLV, VCS, \text{ and } P_1, P_2, \ldots, P_N\}$$

$$F = MLV * (P1, P2, \ldots, PN)$$

where CL is the credit line, $P_1, P_2, \ldots P_N$ are the creditor preferences, and the MLV is the maximum level variable. It should be noted the $P_1, P_2, \ldots P_N$ may be computed respective of VCS. As a non-limiting example, if the MLV of a product is $1,000, P1=80% if 750<VCS<900; otherwise, $P_1$=1; and P2=50% if VCS<500; otherwise, P2=1. Thus, according to this example, for customers with VCS=800, CL in is set to $800 (i.e., 1000*0.8). For customers with credit scores below 500, the credit line is set to $500 (i.e., 1000*0.5). In S360, the established credit line is returned.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The various components and functions represented described herein, may be implemented using any suitable means. Such means are implemented, at least in part, using corresponding structure as taught herein. For example, the components described above in conjunction with the system and/or financing server may correspond to components using similarly designated "means for" functionality. Thus, one or more of such means may be implemented using one or more components, integrated circuits, or other suitable structure as taught herein in some implementations.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for generating a virtual credit score in real-time and establishing and suggesting a credit line to a customer of a customer node, comprising:

receiving a request from a supplier node to generate a virtual credit score for a customer at a customer node, wherein the customer performs an electronic commerce transaction at an electronic commerce website related to the supplier node;

receiving at least one customer identifier of the customer from said supplier node;

retrieving data respective of the customer from at least one data source, wherein the data is retrieved using the at least one customer identifier;

analyzing the retrieved data to determine at least one further customer identifier;

generating the virtual credit score for the customer, in real-time during said electronic commerce transaction, at least based on the determined at least one further customer identifier;

comparing the virtual credit score to a virtual credit threshold to determine if the customer meets the virtual credit threshold; and upon determining that the customer meets the virtual credit threshold, automatically, in real-time and during said electronic commerce transaction and while said electronic commerce website is presented to said customer:

establishing a new credit line for the customer;

creating a webpage for the customer to access said new credit line, said webpage is configured to allow said customer to access and use said new credit line to pay for a purchase during said transaction; and sending a notification to said customer node, said notification offering said new credit line to said customer and providing said customer with information related to said created webpage for accessing said new credit line, including providing a URL of said webpage configured for presenting said webpage to said customer.

2. The computerized method of claim 1, further comprising:

identifying at least one characteristic related to the supplier node and to a supplier; and setting the virtual credit threshold respective of the at least one characteristic.

3. The computerized method of claim 1, further comprising:

sending a notification to the supplier node and to the customer node regarding the successful establishment of the new credit line and information respective of the established new credit line.

4. The computerized method of claim 1, wherein the at least one data source is any one of: a credit bureau database, a social network, a search engine, and a government data source.

5. The computerized method of claim 1, wherein each of the received customer identifiers and the determined customer identifiers is any of: a customer name, an address of the customer, a social security number of the customer, an email address of the customer, a phone number of the customer, content requested from the supplier node by the customer node, demographic information of the customer, credit reports of the customer, and reviews related to the customer.

6. The computerized method of claim 1, wherein generating the virtual credit score further comprises:

assigning each customer identifier with a respective predefined weight value, wherein the predefined weight value determines the importance of the respective customer identifier to a creditworthiness of the customer; and computing the virtual credit score as a sum of a product of each customer identifier and its respective predefined weight value.

7. The computerized method of claim 6, wherein the virtual credit threshold is any of: a minimum monetary value, a minimum credit score by a credit bureau, and a minimum age of a customer.

8. The computerized method of claim 7, further comprising:

normalizing the virtual credit score to represent any one of: a monetary value, a credit score by a credit bureau, and an age of the customer.

9. The computerized method of claim 1, wherein establishing the new credit line to the customer further comprises:

setting at least a maximum level variable based on at least an amount to be financed;

setting at least one creditor preference; and establishing a value of the new credit line as a function of the maximum level variable and the at least one creditor preference.

10. The computerized method of claim 9, wherein the at least one creditor preference is set respective of the virtual credit score.

11. The method of claim 1, wherein said new credit line is established by a creditor being a third party to said electronic commerce transaction.

12. A non-transitory computer readable medium having stored thereon code instructions to be executed by one or more processing units, said code instructions comprising:

code instructions for receiving a request from a supplier node to generate a virtual credit score for a customer at a customer node, wherein the customer performs an electronic commerce transaction in an electronic commerce website related to the supplier node;

code instructions for receiving at least one customer identifier of the customer from said supplier node;

code instructions for retrieving data respective of the customer from at least one data source, wherein the data is retrieved using the at least one customer identifier;

code instructions for analyzing the retrieved data to determine at least one further customer identifier;

code instructions for generating the virtual credit score for the customer, in real-time during said electronic commerce transaction, at least based on the determined at least one further customer identifier;

code instructions for comparing the virtual credit score to a virtual credit threshold to determine if the customer meets the virtual credit threshold; and code instructions for conducting automatically, in real-time, during said electronic commerce transaction and while said electronic commerce website is presented to said customer and upon determining that the customer meets the virtual credit threshold, the steps of:

establishing a new credit line to the customer;

creating a webpage for the customer to access said new credit line, said webpage is configured to allow said customer to access and use said new credit line to pay for a purchase during said transaction; and sending a notification to said customer node, said notification offering said new credit line to said customer and providing said customer with information related to said created webpage for accessing said new credit line, including providing a URL of said webpage configured for presenting said webpage to said customer.

13. A system for generating a virtual credit score in real-time and establishing and suggesting a virtual credit line to a customer of a customer node, comprising:

a processor; and a memory, the memory containing instructions that, when executed by the processor, configure the system to:

receive a request from a supplier node to generate a virtual credit score for a customer at a customer node, wherein the customer performs an electronic commerce transaction in an electronic commerce website related to the supplier node;

receive at least one customer identifier of the customer from said supplier node;

retrieve data respective of the customer from at least one data source, wherein the data is retrieved using the at least one customer identifier;

analyze the retrieved data to determine at least one further customer identifier;

generate the virtual credit score for the customer, in real-time during said electronic commerce transaction, at least based on the determined at least one further customer identifier;

compare the virtual credit score to a virtual credit threshold to determine if the customer meets the virtual credit threshold;

upon determining that the customer meets the virtual credit threshold, automatically, in real-time and during said electronic commerce transaction while said electronic commerce website is presented to said customer:

establishing a new credit line to the customer;

creating a webpage for the customer to access said new credit line, said webpage is configured to allow said customer to access and use said new credit line to pay for a purchase during said transaction; and sending a notification to said customer node, said notification offering said new credit line to said customer and providing said customer with information related to said created webpage for accessing said new credit line, including providing a URL of said webpage configured for presenting said webpage to said customer.

14. The system of claim 13, wherein the system is further configured to:

identify at least one characteristic related to the supplier node and to a supplier; and set the virtual credit threshold respective of the at least one characteristic.

15. The system of claim 13, wherein the system is further configured to:

send a notification to the supplier node and to the customer node regarding the successful establishment of said new credit line and information respective of the established new credit line.

16. The system of claim 13, wherein the at least one data source is any one of: a credit bureau database, a social network, a search engine, and a government data source.

17. The system of claim 13, wherein each of the received customer identifiers and the determined customer identifiers is any of: a customer name, an address of the customer, a social security number of the customer, an email address of the customer, a phone number of the customer, content requested from the supplier node by the customer node, demographic information of the customer, credit reports of the customer, and reviews related to the customer.

18. The system of claim 13, wherein the system is further configured to:

assign each customer identifier with a respective predefined weight value, wherein the predefined weight value determines the importance of the respective customer identifier to a creditworthiness of the customer; and compute the virtual credit score as a sum of a product of each customer identifier and its respective predefined weight value.

19. The system of claim 13, wherein the virtual credit threshold is any one of: a minimum monetary value, a minimum credit score by a credit bureau, and a minimum age of a customer.

20. The system of claim 19, wherein the system is further configured to:

normalize the virtual credit score to represent any one of: a monetary value, a credit score by a credit bureau, and an age of the customer.

21. The system of claim 13, wherein the system is further configured to:

set at least a maximum level variable based on at least an amount to be financed;

set at least one creditor preference; and establish a value of the new credit line as a function of the maximum level variable and the at least one creditor preference.

22. The system of claim 21, wherein the at least one creditor preference is set respective of the virtual credit score.

* * * * *